(12) United States Patent
Mallant et al.

(10) Patent No.: US 6,514,561 B1
(45) Date of Patent: *Feb. 4, 2003

(54) ELECTROLYTIC MEMBRANE, METHOD OF MANUFACTURING IT AND USE

(75) Inventors: Ronald K. A. M. Mallant, Alkmaar (NL); Gijsbertus H. M. Calis, Nuth (NL); Frank A. de Bruijn, Alkmaar (NL)

(73) Assignee: DSM N.V., Te Heenlen (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/305,477

(22) Filed: May 6, 1999

Related U.S. Application Data

(63) Continuation of application No. PCT/NL97/00609, filed on Nov. 5, 1997.

(30) Foreign Application Priority Data

Nov. 6, 1996 (NL) .............................................. 1004456

(51) Int. Cl.$^7$ .............................. B05D 5/12; B05D 3/10
(52) U.S. Cl. .................... 427/115; 427/335; 427/372.2; 427/385.5
(58) Field of Search ..................... 429/30, 33; 427/115, 427/335, 336, 372.2, 385.5, 393.5

(56) References Cited

U.S. PATENT DOCUMENTS

| 4,181,592 | A | * | 1/1980 | Babinski ..................... 204/296 |
|---|---|---|---|---|
| 4,849,311 | A | | 7/1989 | Itoh et al. |
| 4,865,930 | A | | 9/1989 | Kindler et al. |
| 5,164,060 | A | * | 11/1992 | Eisman et al. .............. 204/296 |
| 5,871,552 | A | * | 2/1999 | Tada .......................... 427/115 |
| 6,054,230 | A | * | 4/2000 | Kato et al. ..................... 429/33 |
| 6,254,978 | B1 | | 7/2001 | Bahar et al. ............. 428/305.5 |

FOREIGN PATENT DOCUMENTS

| EP | 309 259 | | 3/1989 |
|---|---|---|---|
| EP | 326 632 | | 8/1989 |
| EP | 504 954 | | 9/1992 |
| JP | 64-22932 | | 1/1989 |
| JP | 06 342 667 A | * | 12/1994 |

\* cited by examiner

Primary Examiner—Patrick Ryan
Assistant Examiner—Gregg Cantelano

(57) ABSTRACT

Electrolytic membrane comprising an ion-conducting polymer which is fixed in the pores of a porous polyalkene membrane stretched in at least one direction, wherein the polyalkene membrane has a porosity of 30–90% and a mean pore diameter of 0.1 to 5.0 $\mu$m.

Figure 1:
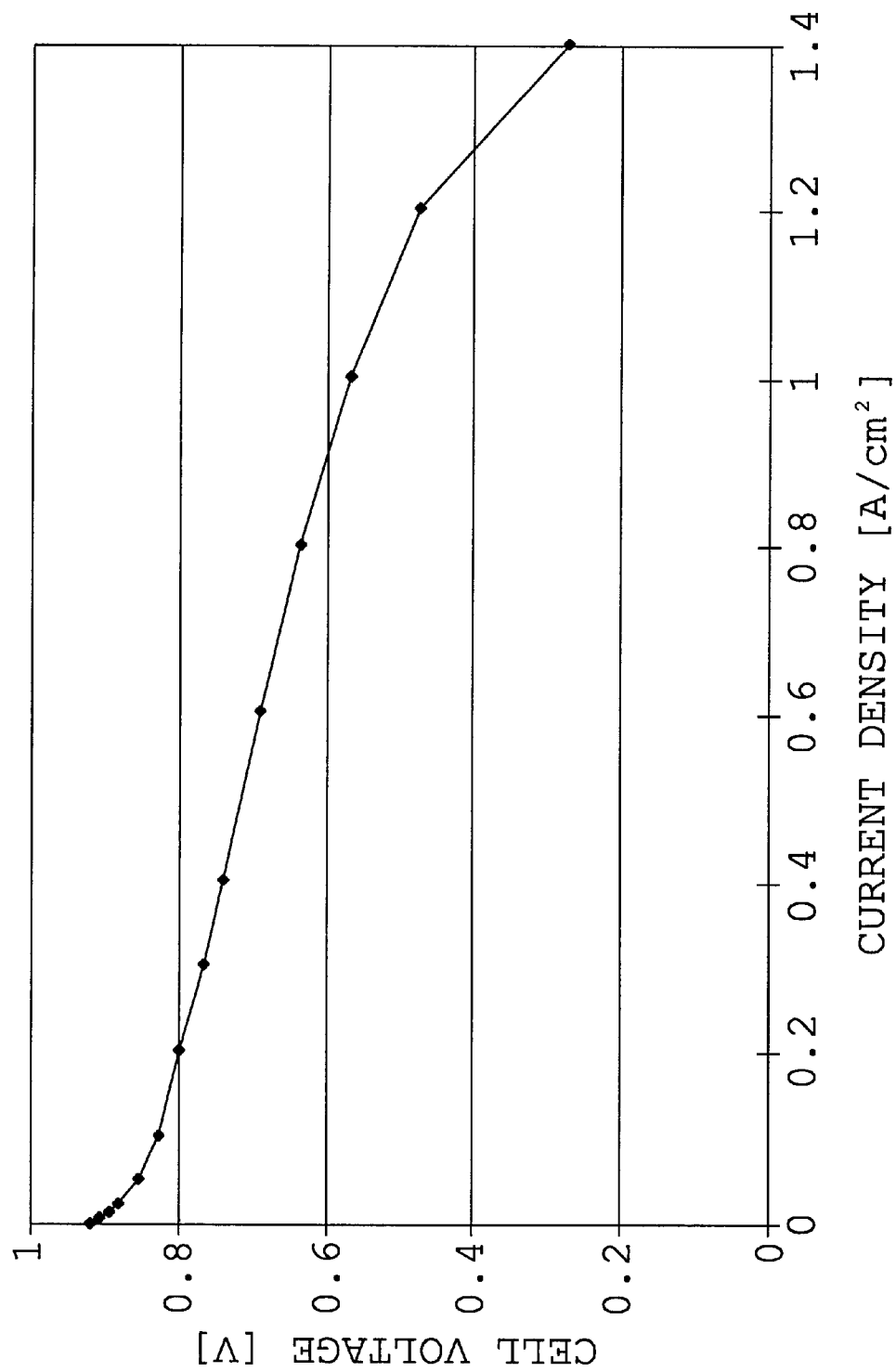

The electrolytic membrane can be manufactured by impregnating the polyalkene with a suitable solution of the ion-conducting polymer at a temperature which is at least 80° C., preferably at least 110° C., and which is not above the melting point of the polyalkene membrane used.

The electrolytic membrane is very suitable for use in solid-polymer fuel cells and batteries.

5 Claims, 6 Drawing Sheets

ELECTROLYTIC MEMBRANE, METHOD OF MANUFACTURING IT AND USE

This is a Continuation of: International Appln. No. PCT/NL97/00609 filed Nov. 5, 1997.

The invention relates to an electrolytic membrane comprising an ion-conducting polymer which is fixed in pores of a polyalkene membrane whose porosity is 30–90% by volume. Such membranes are used, for example, in fuel cells, electrolysis cells, primary and secondary batteries. In particular, such membranes are used at points where a high ion conductivity is desired in combination with a high mechanical strength. Although a high ion conductivity can be obtained by using a membrane having a small thickness, a small thickness is generally achieved at the expense of the strength of the membrane.

Such membranes are disclosed in U.S. Pat. No. 4,849,311. U.S. Pat. No. 4,849,311 describes an electrolytic membrane which contains an ion-conducting polymer which is fixed in the pores of a porous polyethylene membrane. The porosity of the membrane described in U.S. Pat. No. 4,865,930 is between 40 and 90%. The pores have a mean size between 0.001 $\mu$m and 0.1 $\mu$m. According to the teaching of U.S. Pat. No. 4,849,311, pores having a mean diameter greater than 0.1 $\mu$m are difficult to fill and, once filled, the electrolyte easily leaks out again. The membrane is preferably made of polyethylene having a weight-average molar mass of at least 500,000 g/mol. Nafion® is described as ion-conducting polymer; a perfluorocarbon compound containing a sulphonic acid group.

A disadvantage of such a membrane is that the ion conductivity is relatively low.

The object of the invention is to provide an electrolytic membrane having a higher ion conductivity.

According to the invention, this object is achieved in that the membrane is stretched in at least one direction and has a mean pore size between 0.1 and 5 $\mu$M.

The membrane according to the invention is found to have a higher ion conductivity than a known membrane having a smaller pore size and a comparable membrane thickness, porosity and strength.

An advantage of the membrane according to the invention is that it is gastight, as a result of which the membrane is very suitable to be used in a solid-polymer fuel cell.

The membrane according to the invention contains an ion-conducting polymer. Ion-conducting polymers which can be used are known and a few are even commercially available. Suitable polymers are described in Patent Specifications U.S. Pat. Nos. 4,849,311 and 4,865,930. Ion-conducting polymers which are preferably used are polymers based on perfluorosulphonic acid and copolymers of tetrafluoroethylene with perfluorosulphonyl ethoxyvinyl ether are very suitable, the sulphonyl groups being converted into sulphonic acid groups. Such polymers are commercially available under the brand names Nafion and Aciplex. Other examples of suitable ion-conducting polymers are complexes of alkali-metal or alkaline-earth-metal salts with a polar polymer. Examples of these are polyethylene glycol ethers. Complexes of the abovementioned polymers with an ion-donating acid can also be used.

In the membrane according to the invention, the ion-conducting polymer is fixed in the pores of a polyalkene membrane.

Suitable as porous polyalkene membrane are, in particular, porous membranes of polyethylene, polypropylene and ethylene-propylene copolymers. The porosity of the polyalkene membrane according to the invention is between 30 and 90% by volume. This means that the volume of the pores accounts for 30–90% by volume of the total volume of the total membrane.

It has been found that, at a porosity lower than 30%, the ion conductivity of the membrane decreases, while, at a porosity greater than 90%, the mechanical strength decreases undesirably.

The best results are obtained with a polyalkene membrane having a porosity of 60 to 85%.

The membrane according to the invention is stretched in at least one direction and has a mean pore size between 0.1 and 5 $\mu$m. In J. Electroanal. Chem. 235 (1987), 299–315, J. Leddy and N. E. Vanderborgh describe how the transport through a Nafion phase, and therefore also the ion conductivity, decreases at pore diameters greater than 0.05 $\mu$m. Surprisingly it was found that, indeed, a membrane stretched in at least one direction having a pore diameter greater than 0.05 $\mu$m has a better ion conductivity than a membrane having a pore diameter smaller than 0.05 $\mu$m.

With a mean pore diameter greater than 5.0 $\mu$m, the ion-conducting polymer can no longer be fixed in the pores because the pores are then too large. The best results are obtained with a pore diameter of 0.15 to 2.5 $\mu$m.

The electrolytic membrane according to the invention has a good mechanical strength, as a result of which no cracks occur even in the case of relatively thin membranes if the membrane is processed for its application. The electrolytic membrane according to the invention preferably has a tensile strength of at least 15 MPa, while the thickness of the membrane may vary from 15 to 150 $\mu$m, preferably from 20 to 60 $\mu$m. With such a thickness, the membrane according to the invention has an ion conductivity of at least 0.0004 S/cm, but the ion conductivity is preferably considerably higher, i.e. at least 0.0008 S/cm, while a particularly suitable membrane has an ion conductivity of 0.002 to 0.08 S/cm.

The invention also relates to a method of manufacturing the electrolytic membrane according to the invention.

Such a method is disclosed in U.S. Pat. No. 4,849,311. In it, the pores of a porous membrane, preferably polyalkene membrane, are filled by means of capillary condensation with a solution of an ion-conducting polymer.

A disadvantage of the method described in U.S. Pat. No. 4,849,311 is that it is difficult to manufacture an electrolytic polyalkene membrane whose pores have a mean diameter of more than 0.1 $\mu$m. According to the said patent specification, the mean pore diameter should preferably be even less than 0.025 $\mu$m. The reason given for this is that the ion-conducting polymer leaks away from pores greater than 0.1 $\mu$m so that such a membrane is unstable.

The object of the invention is to eliminate said disadvantage completely or partially.

According to the invention said object is achieved by a method which comprises the following steps:

a) dissolving an ion-conducting polymer in a solvent, at least 25% by weight of which is composed of a component having a boiling point higher than 125° C., b) applying an amount of the solution prepared under (a) to a horizontal polyalkene membrane stretched in at least one direction and having a pore volume of 30–90% of the total volume of the membrane, the amount of the solution being chosen in such a way that the volume of the ion-conducting polymer present therein is more than 60% of the pore volume, and the membrane being sealed at the underside, c) evaporating the solvent at a temperature which is at least 80° C. and which is lower than the melting point of the polyalkene membrane.

A stable electrolytic membrane having an ion-conducting polymer fixed in the pores of a polyalkene membrane having a mean pore size between 0.1 and 5.0 μm is manufactured by the method according to the invention.

An advantage of the method according to the invention is that the ion-conducting polymer which is present in the solution on the horizontal stretched membrane becomes preferentially concentrated at the polyalkene surface. Since most of the surface is in the pores, the ion-conducting polymer becomes concentrated in the pores of the membrane. A method in which partially filled pores need to be refilled with a fresh solution can thereby be avoided. The disadvantage of refilling pores is that air inclusions are easily produced. The refilling of partially filled pores is therefore only possible in the presence of solvents which have a low wetting angle with the polyalkene. Such a limitation does not apply in the case of the method according to the invention.

A further advantage of the method according to the invention is that a porous membrane having a pore size above 0.1 μm is easy to impregnate, as a result of which virtually no air is enclosed in the membrane.

In the method according to the invention, an ion-conducting polymer is dissolved in a solvent, at least 25% by weight of which is composed of a component having a boiling point higher than 125° C. Solutions of ion-conducting polymers can be prepared as described in, for example, U.S. Pat. No. 4,849,311. A good method of obtaining a suitable solution of an ion-conducting polymer is, for example, heating the solid polymer in a suitable solvent. Suitable solvents for the preferred polymers perfluorosulphonic acid-based polymers are water and alcohols such as ethanol, n-propanol or isopropanol. The presence of a component having a boiling point of more than 125° C. ensures that the evaporation takes place slowly. This, in combination with a particular pore structure of a stretched membrane, results in the ion-conducting polymer no longer, or scarcely any longer, dissolving after the solvent has evaporated. As a result, a stable membrane is obtained. Suitable components having a boiling point of more than 125° C. are, for example, ethylene glycol, N,N-dimethylformamide and dimethyl sulphoxide. Preferably, the component having a boiling point higher than 125° C. in the solvent and the amount thereof are chosen in such a way that the evaporation takes between 10 and 24 hours.

Preferably, at least 50% by weight of the solvent is composed of a component having a boiling point higher than 150° C. This ensures that the evaporation can take place at a higher temperature without the evaporation time being substantially shortened as a consequence. A further advantage of a component having a boiling point higher than 150° C. is that less of it is necessary to arrive at the desired evaporation time than of a solvent having a lower boiling point. Consequently, the choice of solvent is less critical. In particular, if more than 50% by weight of the component having a boiling point higher than 150° C. is present, higher requirements are imposed on the solubility of the ion-conducting polymer in said component than if said percentage is significantly below 50% by weight. Preferably, the component having a boiling point higher than 150° C. is dimethyl sulphoxide (DMSO). The advantage of DMSO is that it has a boiling point of 189° C. and is not toxic.

A suitable concentration of the ion-conducting polymer in the solvent is between 2 and 25% by weight. Preferably, a solution is used in which the concentration of ion-conducting polymer is 2–5% by weight.

It has been found that slow evaporation at a temperature which is as little as possible below the melting point of the polyalkene membrane adds to the insolubility of the solid ion-conducting polymer formed in the pores.

In the method according to the invention, an amount of the abovementioned solution is applied to a horizontal polyalkene membrane stretched in at least one direction and having a pore volume of 30–90% of the total volume of the membrane, the amount of the said solution being chosen so that the volume of the ion-conducting polymer present therein is more than 60% of the pore volume and the membrane being sealed at the underside.

This ensures that, after the evaporation of the solvent, at least nearly 60% by volume of the pores are filled with the ion-conducting polymer. The fact that a small portion of the ion-conducting polymer remains behind on the surface of the membrane has the result that the amount of ion-conducting polymer in the pores is somewhat below the amount calculated on the basis of the pore volume. Preferably, the amount of the solution is chosen in such a way that at least 80% by volume, or still more preferably, at least 95% by volume of the pores are filled with the ion-conducting polymer. Since, as described above, the ion-conducting polymer preferentially deposits on the polyalkene surface and the total pore surface is many times greater than the outer surfaces of the membrane, the ion-conducting polymer which deposits on the outer surface of the membrane can be neglected in the calculation of the amount of solution containing ion-conducting polymer.

A measure for facilitating the impregnation is first to wet the membrane with the solvent prior to impregnating it with the solution of the ion-conducting polymer.

Polyalkene membranes which are stretched in at least one direction are disclosed in EP-A-504,954. EP-A-504,954 describes a method of preparing a polyalkene membrane from a solution of a polyalkene in a volatile solvent. The membrane passes through a cooling bath containing a coolant and the solvent is removed at a temperature below the temperature at which the polyalkene dissolves in the solvent, after which the membrane is stretched in at least one direction. If the polyalkene is polyethylene, the weight-average molecular weight may vary between 100,000 and 5,000,000 g/mol. Preferably, the membrane contains polyethylene having a weight-average molecular weight which is less than 500,000 g/mol. It has been found that, in the presence of polyethylene having such a molecular weight, it is easy to manufacture membranes having an mean pore size between 0.1 and 5.0 μm. Suitable, in particular, are mixtures of polyethylene with various molecular weights. Thus, a mixture which contains polyethylene having a weight-average molecular weight less than 500,000 $g/cm^3$ can also contain polyethylene having a weight-average molecular weight greater than 1,000,000 $g/cm^3$. As a result of the presence of the latter polyethylene, a high strength of the membrane is obtained.

During the application of the solution of the ion-conducting polymer, the membrane is sealed at the underside. This prevents the solution applied to the membrane from leaving the membrane at the underside and thus from being lost for deposition in the pores of the membrane. The sealing of the membrane at the underside can be effected by, for example, clamping the membrane onto a flat plate.

The solution applied to the membrane is then evaporated at a temperature which is at least 80° C. and which is lower than the melting point of the polyalkene membrane. Preferably, the temperature at which the solvent is evaporated is more than 110° C., the evaporation time being, as already described above, at least 10 hours. It has been found that the higher the temperature at which evaporation is carried out, the lower is the solubility of the solid ion-conducting polymer formed in the H+ form.

Before using the membrane according to the invention, for example in a solid-polymer fuel cell, it should be cleaned. This is possible in various ways and the way in which it is done is not essential for the invention. Any known cleaning procedure can therefore be used. Successive or alternating cleaning with water (Millipore-filtered, 18 megaohm·cm, ultrasound), hydrogen peroxide solution and sulphuric acid solution is a very suitable method.

The electrolytic membranes according to the invention are very suitable for use in fuel cells and, in particular, in solid-polymer fuel cells or polymer-electrolyte fuel cells. Such fuel cells are known per se. Another use of the electrolytic membrane according to the invention is in batteries. The invention also relates to fuel cells and batteries in which the electrolytic membrane is used.

A solid-polymer fuel cell comprises a porous platinum anode and a porous platinum cathode which are both in contact with the electrolytic membrane. In the standard $H_2/O_2$ polymer fuel cell, $H_2$ is oxidized at the anode to $H^+$ ions which are transported through the membrane to the cathode. Water is then formed at the cathode by reduction of $O_2$ in the presence of $H^+$. As a result of the electroosmotic effect, at the anode, water is likewise removed together with $H^+$ through the membrane to the cathode. As a result, there is a risk that drying-out of the anode will occur. In order to combat such drying-out of the membrane, the reactant gases are moistened. A solid-polymer fuel cell is usually operated at a temperature of around 80° C.

The invention is further illustrated by reference to the examples below.

EXAMPLE I 2.8 g of a 5% Nafion 1100 solution in the $H^+$ form (Solution Technology) is mixed with 2.16 g of dimethyl sulphoxide. The impregnation was carried out by applying said solution to a porous polyethylene membrane stretched in two directions (5×5) (Solupor® type 7P20 from DSM Solutech B.V.) having a surface area of 25 cm$^2$, a thickness of 40 μm and a porosity of 81%. The weight-average molecular weight of the polyethylene was 4.5×10$^5$ g/mol and the mean pore diameter was 2.0 μm. The membrane was clamped onto a flat 316L stainless-steel plate. Directly afterwards, the membrane with the impregnation solution on it was placed in an oven where it was heated slowly to 126° C. at atmospheric pressure. The evaporation time was 16 hours.

After the impregnation was complete, it was found that 100% of the pore volume of the membrane was occupied by Nafion 1100. The density of the Nafion in the pores was 1.56 g/cm$^3$.

EXAMPLE II

The impregnated membrane from Example I was then tested in a solid-polymer fuel cell. For this purpose, it was first cleaned by successively cleaning it ultrasonically in 18 megaohm·cm Millipore-filtered water, allowing it to stand for 60 minutes in 3% hydrogen peroxide at 100°C., again cleaning it ultrasonically in 18 megaohm·cm Millipore-filtered water, allowing it to stand for 60 minutes in 1 M sulphuric acid at 80° C., and, finally, cleaning it again ultrasonically in 18 megaohm·cm Millipore-filtered water.

Both sides of the membrane were then coated with 0.1 gramme of an ink composed of 52% 1-propanol, 8% of a 20% by weight Pt/Vulcan catalyst (Vulcan is the trade name of an active carbon having a BET surface area of approximately 300 m$^2$/g) and 40% of the 5% by weight Nafion 1100 solution from Solution Technology. The Pt loading was consequently 0.2 mg/cm$^2$ of cell surface.

The test conditions were as follows:

| Type of fuel/oxidant | $H_2$/air |
|---|---|
| Pressure | 3 bar |
| Type of flow | co-current flow |
| Load | 0.5 V |
| Air moistening temperature | 85° C. |
| $H_2$ moistening temperature | 90° C. |
| $H_2$/air stoichiometry | 1.5/2.5 |
| Cell temperature | 80° C. |

The measured open-circuit voltage of the fuel cell was 0.918 V and the conductivity of the membrane was at least 0.023 S/cm.

FIG. 1 shows the polarization curve of the fuel cell.

EXAMPLE III

Figure 2:
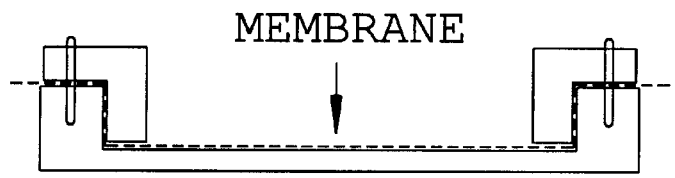

A polyethylene membrane (Solupor Type 7P20) stretched in two directions (5×5) and having a surface area of 25 cm$^2$, a thickness of 40 μm, a porosity of 81% and a mean pore diameter of 1.5 μm was clamped in a stainless-steel jig shown in FIG. 2 and was first wetted with 3 grammes of dimethyl sulphoxide and then impregnated with 4 grammes of a solution which contained 5% Nafion (1100). The jig was then placed in an oven at a temperature of 126° C. After 16 hours, the jig was taken out of the oven and water was poured over the membrane in order to facilitate release from the jig. The thickness of the membrane determined with the aid of a Mitu Toyo Digimatic Indicator ID 110M was 51.1 μm. The membrane was then placed in a beaker and 10 ml of sodium chloride (1 mol/l) was poured over it. The Nafion content was determined by means of an acid-base titration with the aid of phenolphthalein. The density of the Nafion was determined from a film cast from the solution which had undergone the same drying as the membrane. The density of the Nafion was 1.56 g/cm$^3$. The Nafion content determined by means of acid-base titration was found to be 100% by volume of the pore volume of the Solupor membrane.

EXAMPLE IV

A polyethylene membrane (Solupor 7P03) stretched in two directions (5×5) and having a surface area of 25 cm$^2$, a thickness of 35 μm, a porosity of 78% and a mean pore diameter of 0.3 μm was clamped in a stainless-steel jig as shown in FIG. 2 and was first wetted with 1.9 grammes of dimethyl sulphoxide and then impregnated with 2.5 grammes of a solution which contained 5% Nafion (1100). The jig was then placed in an oven at a temperature of 124° C. After 16 hours, the jig was taken out of the oven and water was poured over the membrane in order to facilitate release from the jig. The thickness of the membrane determined with the aid of a Mitu Toyo Digimatic Indictor ID 110M was 25.6 μm. The Nafion content was found to be 100% by volume of the original pore volume of the Solupor membrane.

EXAMPLE V

A polyethylene membrane (Solupor type 7P03) having a surface area of 25 cm$^2$, a thickness of 35 μm, a porosity of 78% and a mean pore diameter of 0.3 μm was clamped in a stainless-steel jig as shown in FIG. 2 and was first wetted with 1.9 grammes of dimethyl sulphoxide and then impregnated with 2.5 grammes of a solution which contained 5% Aciplex having an equivalent weight of 950 g/mol (Asahi Chemical). The jig was then placed in an oven at a temperature of 126° C. After 16 hours, the jig was taken out of the oven and water was poured over the membrane in order to facilitate release from the jig.

The thickness of the membrane determined with the aid of a Mitu Toyo Digimatic Indicator ID 110M was 29.7 μm.

The Nafion content was found to be 100% by volume of the original pore volume of the Solupor membrane.

EXAMPLE VI

Figure 3:
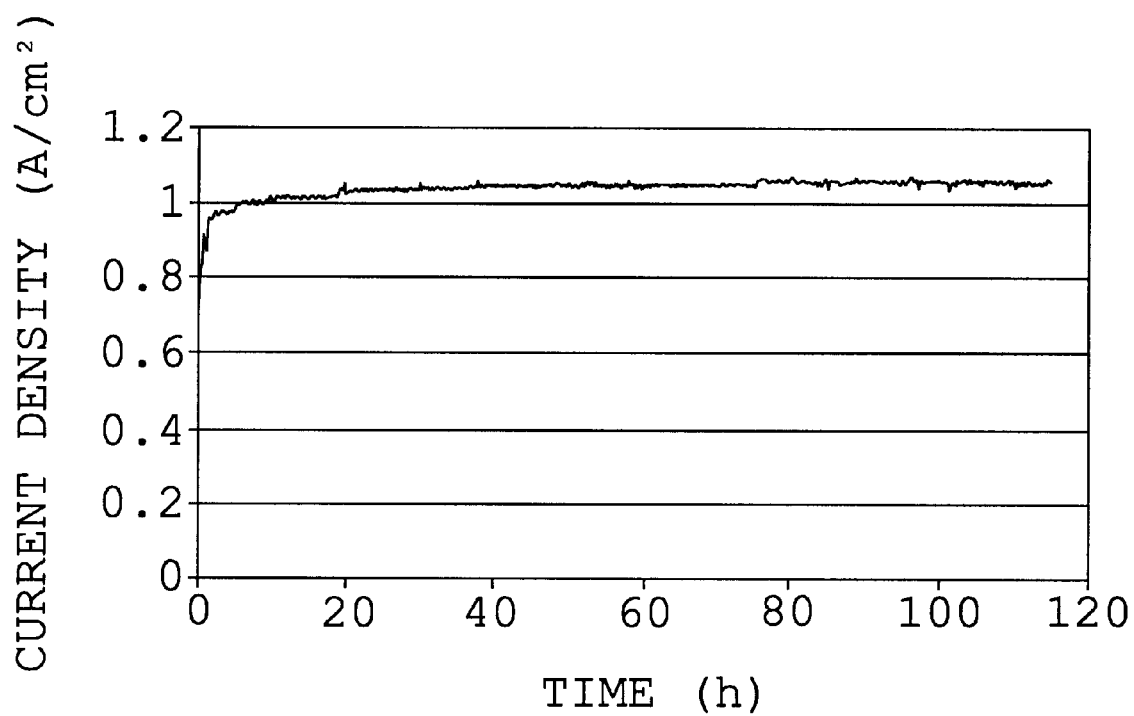
Figure 4:
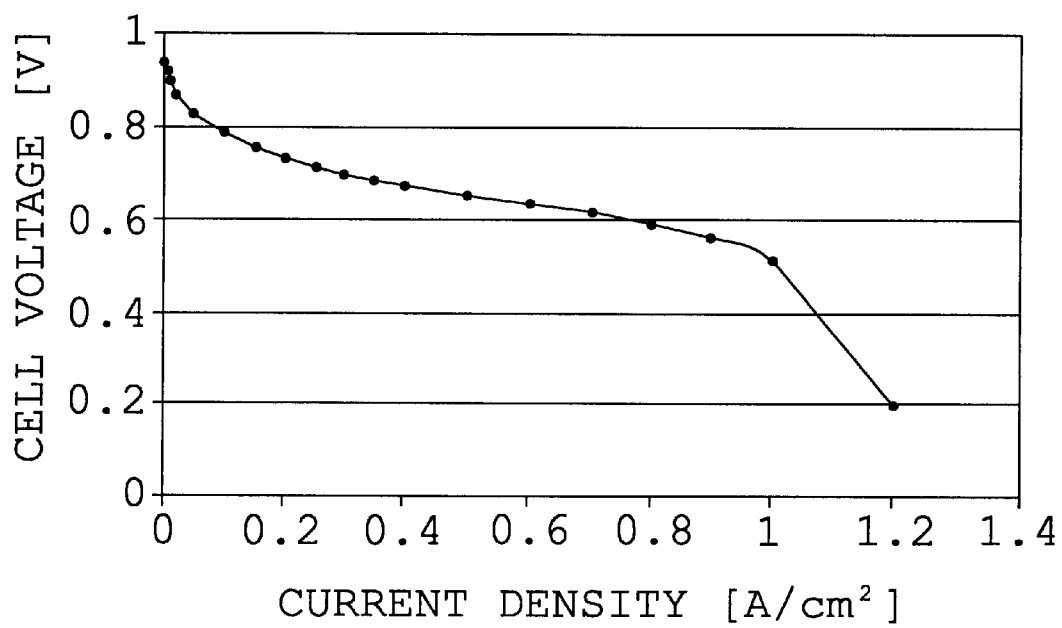

The membrane of Example III was successively cleaned in a 3% peroxide solution, Millipore-filtered 18 megaohm·cm water, 1 M sulphuric acid and Millipore-filtered 18 megaohm·cm water. Two platinum-on-carbon gas-diffusion electrodes (E-TEK Inc.) having a surface area of 6.76 cm$^2$ and having a platinum content of 0.35 mg/cm$^2$ were hot-pressed onto both sides of said membrane and served as anode and cathode of a solid-polymer fuel cell. This membrane-electrode assembly was tested as a solid-polymer fuel cell at a cell temperature of 80° C. with hydrogen as fuel and air as oxidant, both at a gas pressure of 3 bar absolute. The hydrogen gas was moistened at 90° C. and the air was moistened at 60° C. FIG. 3 shows the current density at 0.5 V as a function of time. The polarization curve of the cell is presented in FIG. 4.

EXAMPLE VII

Figure 5:
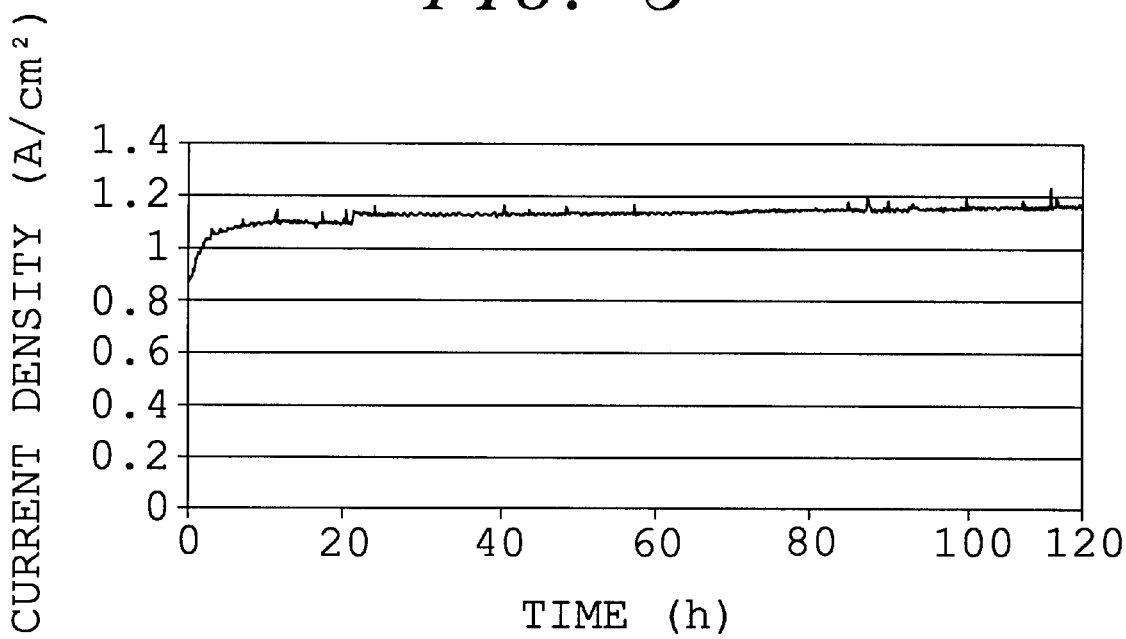
Figure 6:
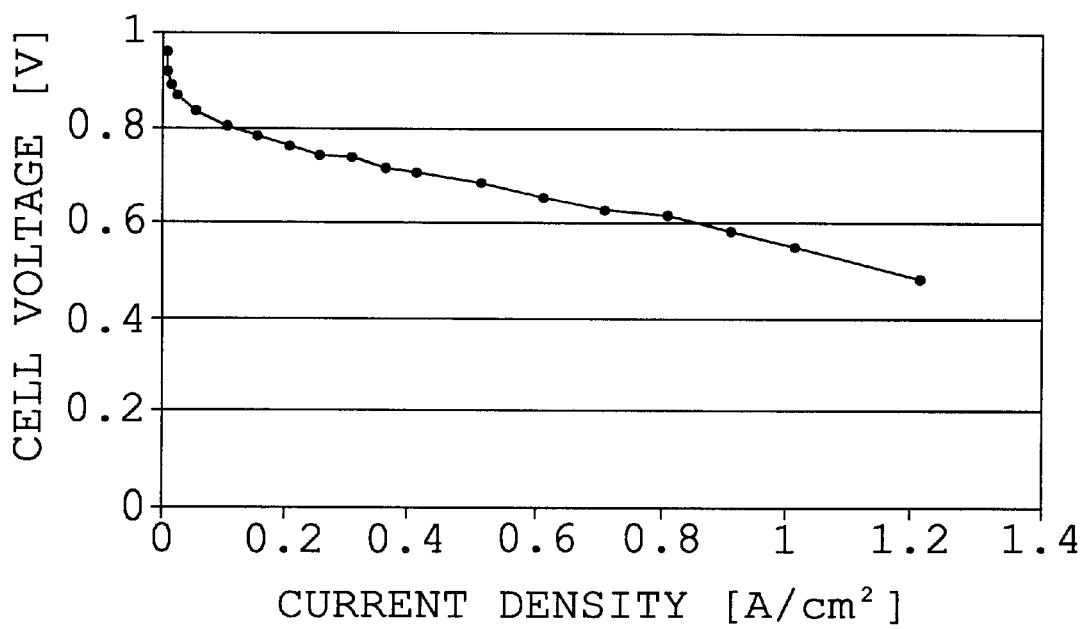

The membrane of Example III was successively cleaned in a 3% peroxide solution, Millipore-filtered 18 megaohm·cm water, 1 M sulphuric acid and Millipore-filtered 18 megaohm·cm water. 0.1 g of a 40% platinum-on-carbon catalyst paste was applied to both sides of said membrane. After evaporation of the paste solvent at ambient temperature, both an anode and a cathode having a platinum content of 0.3 mg/cm$^2$ were obtained. This membrane-electrode assembly was tested as a solid-polymer fuel cell at a cell temperature of 80° C. with hydrogen as fuel and air as oxidant, both at a gas pressure of 3 bar absolute. The hydrogen gas was moistened at 90° C. and the air was moistened at 60° C. FIG. 5 shows the current density at 0.5 V as a function of time. The polarization curve of the cell is presented in FIG. 6. From the comparison of the results of Examples VI and VII it is evident that the electrodes formed with paste are a good alternative to the hot-pressed electrodes.

EXAMPLE VIII

Figure 7:
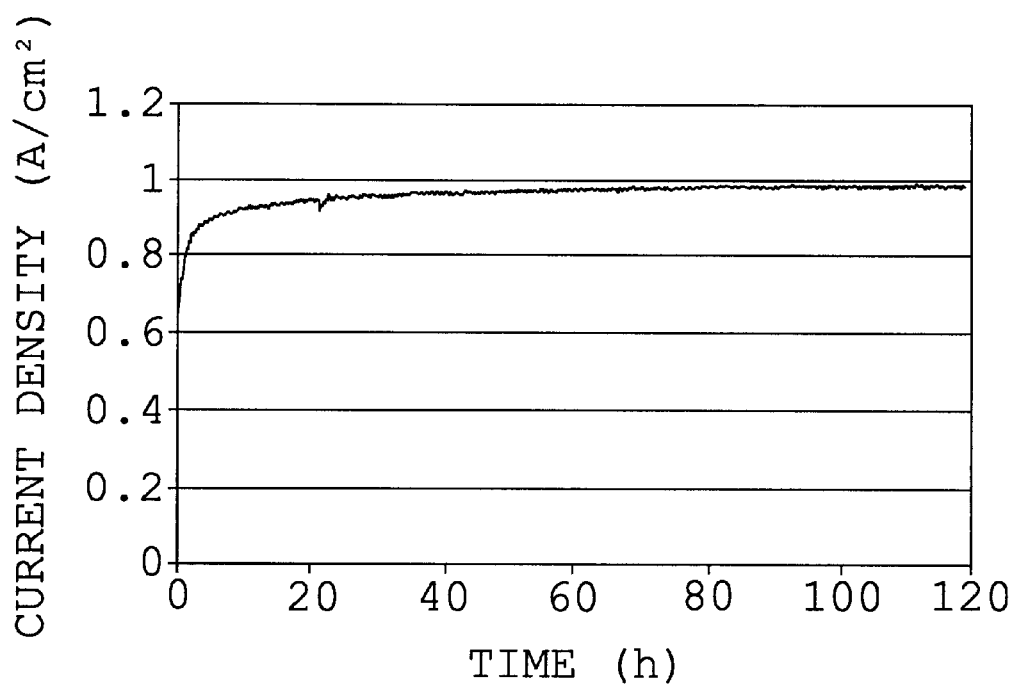
Figure 8:
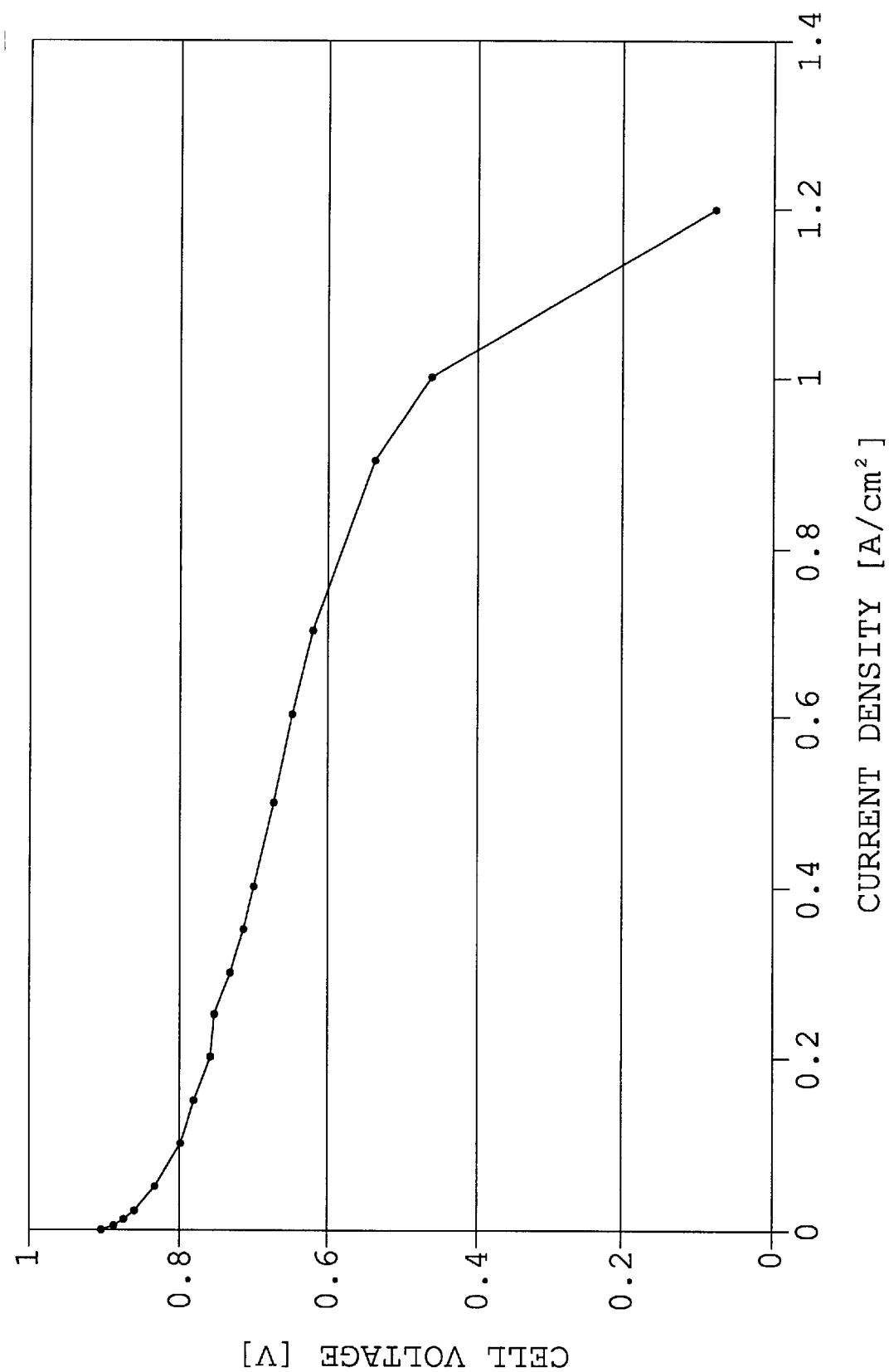

The membrane of Example V was successively cleaned in a 3% peroxide solution, Millipore-filtered 18 megaohm·cm water, 1 M sulphuric acid and Millipore-filtered 18 megaohm·cm water. Two platinum-on-carbon gas-diffusion electrodes having a surface area of 6.76 cm$^2$ and a platinum content of 0.35 mg/cm$^2$ (E-TEK Inc.) were hot-pressed onto both sides of said membrane and served as anode and cathode of a solid-polymer fuel cell. This membrane-electrode assembly was tested in a solid-polymer fuel cell at a cell temperature of 80° C. with hydrogen as fuel and air as oxidant, both at a gas pressure of 3 bar absolute. The hydrogen gas was moistened at 90° C. and the air was moistened at 60° C. FIG. 7 shows the current density as a function of time at a cell voltage of 0.6 V. After 48 hours, the current density was found to be 0.777 A/cm$^2$, while the current density after 3000 hours was still 0.812 A/cm$^2$. If the original current density is defined as the current density after 48 hours, it is evident from this that the current density after 3000 hours through a membrane according to the invention provided with platinum-on-carbon electrodes as a solid-polymer fuel cell is at least 90% of the original current density at 0.6 V. The polarization curve of the cell is presented in FIG. 8.

EXAMPLE IX

A polyethylene membrane (Solupor type 7P03) having a surface area of 300 cm$^2$, a thickness of 35 μm, a porosity of 78% and a mean pore diameter of 0.3 μm was completely moistened with dimethyl sulphoxide and then clamped in a stainless-steel jig as shown in FIG. 2 and impregnated with a mixture of 27 grammes of dimethyl sulphoxide and 35.5 grammes of a solution which contained 5% Nafion 1100. The jig was then placed in an oven at a temperature of 112° C. After 16 hours, the jig was taken out of the oven and water was poured over the membrane in order to facilitate release from the jig.

The thickness of the membrane determined with the aid of a Mitu Toyo Digimatic Indicator ID 110M was between 37 and 48 μm.

EXAMPLE X

Figure 9:
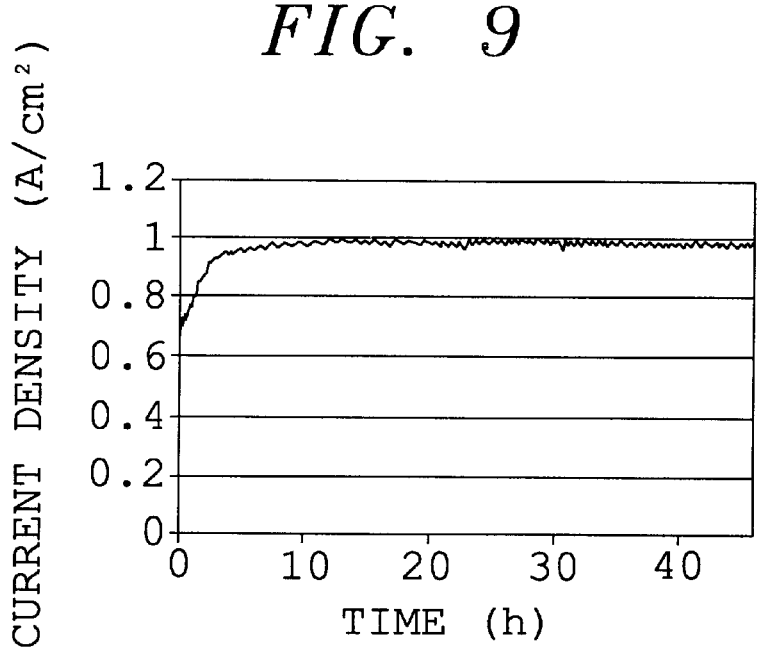
Figure 10:
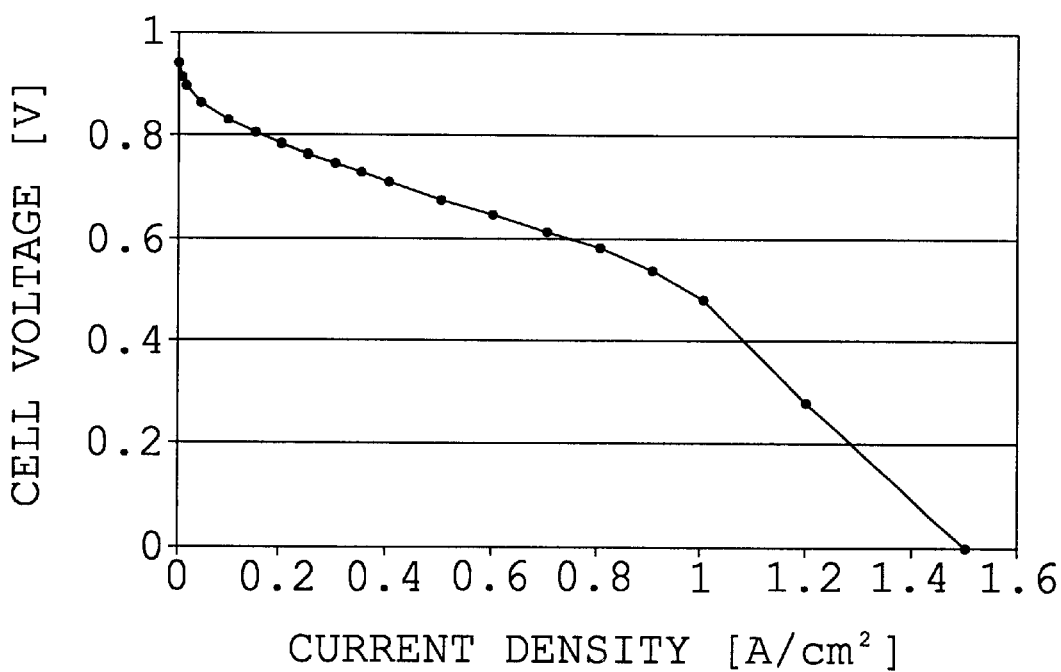

A surface area of 100 cm$^2$ of the membrane of Example IX was successively cleaned in a 3% peroxide solution, Millipore-filtered 18 megaohm·cm water, 1 M sulphuric acid and Millipore-filtered 18 megaohm·cm water. Two platinum-on-carbon gas-diffusion electrodes having a surface area of 50 cm$^2$ and a platinum loading of 0.35 mg/cm$^2$ (E-TEK Inc.) were hot-pressed onto both sides of said membrane and served as anode and cathode of the solid-polymer fuel cell. This membrane-electrode assembly was tested as a solid-polymer fuel cell at a cell temperature of 80° C. with hydrogen as fuel and air as oxidant, both at a gas pressure of 3 bar absolute. The hydrogen gas was moistened at 90° C. and the air was moistened at 60° C. FIG. 9 shows the current density as a function of time at a cell voltage of 0.5 V. The polarization curve of the cell is presented in FIG. 10. From this it is evident that the polarization curve and the stability of the current density are not influenced by the size of the membrane surface.

What is claimed is:

1. Method of manufacturing an electrolytic membrane comprising:
    a) forming a solution by dissolving an ion-conducting polymer in a solvent, at least 25% by weight of which is composed of a component having a boiling point higher than 125° C.,
    b) applying an amount of the solution prepared under (a) to a horizontal polyalkene membrane having an upper side and an underside stretched in at least one direction and having a pore volume of 30–90% of the total volume of the membrane, the amount of the solution being chosen in such a way that the volume of the ion-conducting polymer present therein is more than 60% of the pore volume, and the membrane being sealed at the underside,
    c) evaporating the solvent at a temperature which is at least 80° C. and which is lower than the melting point of the polyalkene membrane;

wherein said electrolytic membrane comprises the ion-conducting polymer fixed in pores of the polyalkene membrane whose porosity is 30–90% by volume, wherein the polyalkene membrane is stretched in at least one direction, has a mean pore size between 0.1 and 5 μm, and has a current density of at least 0.5 A/cm² at a cell voltage of 0.6 V using air as oxidant.

2. Method according to claim 1, wherein at least 50% by weight of the solvent is composed of a component having a boiling point higher than 150° C.

3. Method according to claim 2, wherein the component having a boiling point higher than 150° C. is dimethyl sulphoxide.

4. Method according to one of claims 1–3, wherein the solvent is evaporated at a temperature of at least 110° C.

5. Method according to one of claims 1–3, wherein the polyalkene contains polyethylene having a weight-average molecular weight of less than 500,000 g/mol.

\* \* \* \* \*

UNITED STATES PATENT AND TRADEMARK OFFICE
CERTIFICATE OF CORRECTION

PATENT NO.     : 6,514,561 B1
DATED          : February 4, 2003
INVENTOR(S)    : Mallant et al.

It is certified that error appears in the above-identified patent and that said Letters Patent is hereby corrected as shown below:

<u>Title page,</u>
Item [73], please correct the Assignee residence city to read:
-- Heerlen --.

Signed and Sealed this

Fourth Day of November, 2003

JAMES E. ROGAN
*Director of the United States Patent and Trademark Office*